(12) United States Patent
Hong et al.

(10) Patent No.: US 8,107,699 B2
(45) Date of Patent: Jan. 31, 2012

(54) FEATURE PROCESSING FOR LUNG NODULES IN COMPUTER ASSISTED DIAGNOSIS

(75) Inventors: Lin Hong, Monmouth Junction, NJ (US); Christopher V. Alvino, Allenwood, NJ (US); Hong Shen, Plainsboro, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 873 days.

(21) Appl. No.: 12/170,639

(22) Filed: Jul. 10, 2008

(65) Prior Publication Data

US 2009/0041328 A1 Feb. 12, 2009

Related U.S. Application Data

(60) Provisional application No. 60/954,647, filed on Aug. 8, 2007.

(51) Int. Cl.
*G06K 9/00* (2006.01)
(52) U.S. Cl. ....................................................... 382/128
(58) Field of Classification Search .................. 382/128, 382/132
See application file for complete search history.

(56) References Cited

U.S. PATENT DOCUMENTS

| 6,836,558 | B2 | 12/2004 | Doi et al. |
| 2004/0109595 | A1 | 6/2004 | Luo et al. |

OTHER PUBLICATIONS

Suzuki et al., "False-positive reduction in computer-aided diagnostic scheme for detecting nodules in chest radiographs by means of massive training artificial neural network<1>", Academic Radiology, Reston, VA, vol. 12, No. 2, Feb. 1, 2005, pp. 191-201.
Campadelli et al., "A Fully Automated Method for Lung Nodule Detection From Postero-Anterior Chest Radiographs", IEEE Transactions on Medical Imaging, IEEE Service Center, Piscataway, NJ, vol. 25, No. 12, Dec. 1, 2006, pp. 1588-1603.
Van Ginneken et al, "Computer-Aided Diagnosis in Chest Radiography: A Survey", IEEE Transactions on Medical Imaging, IEEE Service Center, Piscataway, NJ, vol. 20, No. 12, Dec. 1, 2001.
Cheng et al., "High Dynamic Range Display Adopting High Dynamic Range Imaging Technique", Laser&Electro-Optics Society, IEEE, Oct. 1, 2006, pp. 715-716.
International Search Report including Notification of Transmittal of the International Search Report, International Search Report, and Written Opinion of the International Searching Authority.
Lo et al., "Extraction of rounded and line objects for the improvement of medical image pattern recognition", Nuclear Science Symposium and Medical Imaging Conference, 1994, 1994 IEEE Conference Record Norfolk, VA, Oct. 30-Nov. 5, 1994, New York, NY, IEEE, vol. 4, Oct. 30, 1994, pp. 1802-1806.
Ballard, "Generalizing the Hough Transform to detect arbitrary shapes", Pattern Recognition, Elsevier, GB, vol. 13, No. 2, Jan. 1, 1981, pp. 111-122.

(Continued)

*Primary Examiner* — Clayton E LaBalle
*Assistant Examiner* — Dennis Hancock

(57) ABSTRACT

Feature processing is provided for lung nodules in computer-assisted diagnosis. A feature that may better distinguish nodules from background is extracted using a Hough transform. Rather than relying on a specific boundary shape, the Hough transform accumulates evidence associated with a region, such as a ring region. The accumulated evidence provides a feature score without requiring a nodule to fit a specific shape. In another approach, a background level is determined from extracted features. Rather than attempting to normalize an image prior to extraction, the features are normalized. The feature normalization and generalized Hough transform extraction may be used together or alone.

21 Claims, 3 Drawing Sheets

OTHER PUBLICATIONS

Ballard et al., "A ladder-structured decision tree for recognizing tumours in chest radiographs", IEEE Transactions on Computers, IEEE Service Center, Los Alamitos, CA, vol. C-25, No. 5, May 1, 1976, pp. 503-513.

Lou et al., "Object-based deformation technique for 3D CT lung nodule detection", Proceedings of the SPIE, Bellingham, VA, vol. 3661, No. Part 1-2, Jan. 1, 1999, pp. 1544-1552.

Tsantis et al., "A hybrid multi-scale model for thyroid nodule boundary detection on ultasound images", Computer Methods and Programs in Biomedicine, Elsevier, Amsterdam, NL, vol. 84, No. 2-3, Nov. 9, 2006, pp. 86-98.

Kenji Suzuki, et al., "Suppression of the Contrast of Ribs in Chest Radiographs by Means of Massive Training Artificial Neural Network", Medical Imaging 2004; Proc of SPIE vol. 5370, 2004; pp. 1109-1119.

Hui Zhao, et al., "Enhanced Lung Cancer Detection in Temporal Subtraction Chest Radiography Using Directional Edge Filtering Techniques", Medical Imaging 2002; Proc of SPIE vol. 4684, 2002; pp. 698-703.

Arnold M.R. Schilham, et al., "Multi-scale Nodule Detection in Chest Radiographs", Image Sciences Institute, University Medical Cener Utrecht, The Netherlands, 2003, pp. 602-609.

Bilgin Keserci, et al., "Computerized Detection of Pulmonary Nodules in Chest Radiographs Based on Morphological Features and Wavelet Snake Model", Medical Image Analysis 6 (2002), pp. 431-447.

Hiroyuki Abe, et al., "Computer-Aided Diagnosis in Chest Radiology", Seminars in Ultrasound CT and MRI, 2004; pp. 432-437.

Junji Shiraishi, et al., "Development of a Computerized Scheme for Detection of Very Subtle Lung Nodules Located in Opaque Areas on Chest Radiographs", Proc of SPIE vol. 6144 (2006).

Jyh-Shyan Lin, et al., "Reduction of False Positives in Lung Nodule Detection Using a Two-Level Neural Classification", IEEE Transactions on Medical Imaging, vol. 15, No. 2, Apr. 1996; pp. 206-217.

Shih-Chung B. Lo, et al., "Artificial Convolution Neural Network Techniques and Applications for Lung Nodule Detection", IEEE Transactions on Medical Imaging, vol. 14, No. 4, Dec. 1995, pp. 711-718.

Matthew Freedman, "State-of-the-Art Screening for Lung Cancer (part 1): the Chest Radiograph", Thorac Surg Clin 14 (2004) 43-52.

Hidefumi Kobatake, "Convergence Index Filter for Vector Fields", IEEE Transactions on Image Processing, vol. 8, No. 8, Aug. 1999, pp. 1029-1037.

Qiang Li, et al., "Computer-Aided Diagnostic Scheme for Lung Nodule Detection in Digital Chest Radiographs by Use of a Multiple-Template Matching Technique", Med. Phys. 28 (10), Oct. 2001, pp. 2070-2076.

Bram van Ginneken, et al., "Computer-Aided Diagnosis in Chest Radiography: A Survey", IEEE Transactions on Medical Imaging, vol. 20, No. 12, Dec. 2001, pp. 1228-1241.

FEATURE PROCESSING FOR LUNG NODULES IN COMPUTER ASSISTED DIAGNOSIS

RELATED APPLICATIONS

The present patent document claims the benefit of the filing date under 35 U.S.C. §119(e) of Provisional U.S. Patent Application Ser. No. 60/954,647, filed Aug. 8, 2007, which is hereby incorporated by reference.

BACKGROUND

The present embodiments relate to feature processing for lung nodules. Features are extracted and used for computer-assisted diagnosis of lung health.

A processor may detect lung nodules from chest x-ray radiographs. A number of automatic lung nodule detection techniques have been developed to help radiologists improve accuracy as well as efficiency in lung cancer screening and diagnosis. Unfortunately, nodule detection in chest x-ray radiographs is a very difficult problem. Automatic nodule detection techniques have difficulty in effectively coping with variations of chest x-ray images. Image characteristics, such as the brightness of a given image, may vary between input images. Nodules may vary, such as appearing larger, smaller, brighter, lighter or weaker, and/or having different shapes. Different background structures, such as ribs, vessels, patient specific lung properties (e.g., scarring, broken rib, or missing lobe), exist.

Feature extraction techniques have been proposed. Extracting discriminating features is important for automatic nodule detection. In general, nodules in chest x-ray radiographs are round-shaped blobs with some limited intensity difference from the rest of the background structures. The nodules may have very little intensity difference from the background. Variations in image characteristics, nodules, and background structures result in significant variations in the combined intensity represented on the x-ray radiograph. As a result, the nodule features are highly position dependent. For example, a peak feature of a nodule in a vessel tree region needs to be more distinguishing for the nodule to be detectable than a peak feature of a nodule in the middle of a lung lobe region. The lung lobe region has ribs and rib crosses, which are more easily distinguished from nodule peaks. The blood of vessels tends to limit x-ray penetration, resulting in weaker indication of a peak.

The positional dependency of the distinction between a lung nodule and the background may be addressed by including position coordinates in feature vectors. Sophisticated learning algorithms may attempt to compensate for such position dependency. Such an approach requires a large data set, and, even if properly trained, may not be sufficiently accurate in practice. It is desirable that such position dependency is fully recovered in classification of genuine nodules and false positives. However, the position dependency is neither well defined nor easy to obtain due to variations in nodules, image properties, and background structures for different images and/or patients.

Intrinsic nodule features that can effectively differentiate genuine nodules from similar background anatomical structures are difficult to extract. Adaptive ring filtering based techniques evaluate the convergence properties of image gradient vectors inside a region of interest around a nodule. This adaptive ring filtering depends on the orientation distribution of the gradient vector and is independent of the intensity and contrast. Some weak and some strong nodules may be captured. However, variation in nodule shape may cause some nodules to be missed.

Matching filter techniques apply a filter or a number of filters with a shape similar to nodules to an input image to enhance the genuine nodules while suppressing false positives and/or other background anatomical structures. Features are then extracted from the enhanced image. Gaussian type of filters, learned (average) nodule shape type filters, and Laplacian of Gaussian (LoG) filters have been used. Filtering may be able to remove a significant number of false positives. However, matched filtering may have limited capability in tolerating complex background structures or in sufficiently enhancing weak nodules.

A snake model may be used to locate a nodule boundary for feature extraction. Unfortunately, nodule boundary localization may be as difficult as nodule detection. Snake models may insufficiently handle background structures and weak nodules.

Other approaches attempt to segment background structures, such as rib cross labeling using segmentation information. The background structure may be removed, at least in part, from the x-ray image. However, other background structures may be difficult to identify and/or remove without also removing nodule information.

BRIEF SUMMARY

By way of introduction, the preferred embodiments described below include methods, systems or computer readable media for feature processing for lung nodules in computer-assisted diagnosis. A feature that may better distinguish nodules from background is extracted using a generalized Hough transform. Rather than relying on a specific boundary shape, the generalized Hough transform accumulates evidence associated with a region, such as a ring region. The accumulated evidence provides a feature score without requiring a nodule to fit a specific shape. In another approach, a background level is determined from extracted features. Rather than attempting to normalize an image prior to extraction, the features are normalized. The feature normalization and generalized Hough transform extraction may be used together or alone.

In a first aspect, a method is provided for feature processing for lung nodules in computer-assisted diagnosis. A candidate list of feature values associated with features extracted from a medical image having possible lung nodules is received. A feature background is estimated from at least a sub-set of the feature values of the candidate list. The feature values of the candidate list are normalized as a function of the feature background.

In a second aspect, a system for feature processing of lung nodule features in computer-assisted diagnosis is provided. A processor is operable to normalize feature values for features of a medical image as a function of the feature values distribution in the medical image and is operable to classify whether the features are possible lung nodules as a function of the normalized feature values. A display is operable to display a location on the medical image of the features classified as possible lung nodules.

In a third aspect, a computer readable storage media has stored therein data representing instructions executable by a programmed processor for feature processing of lung nodule features in computer-assisted diagnosis. The storage media includes instructions for receiving a list of features, ranking the features in the list as a function of feature score, removing higher scoring features from the list, estimating a background score as a function of location from the feature scores of the list after removing, and correcting the feature scores of the features in the list as a function of the background score.

In a fourth aspect, a method for feature processing of lung nodule features in computer-assisted diagnosis is provided. A medical image having possible lung nodules is received. At least one of the possible lung nodules is extracted from the medical image as a function of a Hough transform.

In a fifth aspect, a computer readable storage media has stored therein data representing instructions executable by a programmed processor for feature processing of lung nodule features in computer-assisted diagnosis. The storage media includes instructions for identifying an imperfect instance of a feature ring shape by a voting procedure in a parameter space, and calculating a score of a possible lung nodule feature corresponding to the feature ring shape, the score calculated as a function of gradient information associated with the feature ring shape.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Feature normalization may improve the effectiveness of a nodule feature. The position dependency of a nodule feature is reduced, making the feature more effective in differentiating false positives from genuine nodules. A position independent feature is derived from the feature values for a pool of candidates likely to be false positives. The normalized feature may better distinguish nodules than non-normalized features, providing better classification in chest x-ray images.

Blob feature extraction may capture distinguishing properties for both obvious and subtle nodules, differentiating genuine nodules from false positives. A generalized Hough transform algorithm derives an estimate of a ring like support region that approximately covers the boundary region of a nodule. A set of rule-based gradient analyses is used to accumulate evidence inside the support ring region and beyond to evaluate the possibility of presence of a generally circular blob. The blob feature may be more effective than other features in capturing subtle nodules while still keeping a good discriminating capability for obvious nodules and/or nodules on significant background structures.

Feature normalization and the blob feature may be used together. Feature normalization of the blob feature (both aspects being used together) may assist in classifying possible nodules. For example, different types of features are extracted. Some of the features are used initially to limit a number of possible nodules. These features may or may not be normalized. Other more computationally expensive features, such as the blob feature, may then be extracted for the more limited set of possible nodules. The blob feature or other features are normalized, and the normalized features are used to remove false positives, leaving possible nodules most likely to be actual nodules.

Feature normalization and the blob feature may be used separately. Feature normalization represents an operation that normalizes a nodule feature to make the feature relatively independent of position in a chest x-ray image. Feature normalization may be applied to any feature. The feature normalization is related to the underlying feature and the feature extraction algorithm, but may be independent of the underlying feature. A feature may be used without normalization, such as the blob feature being used without normalization. In the example embodiments below, the feature normalization algorithm is provided in the context of the blob feature.

Figure 1:
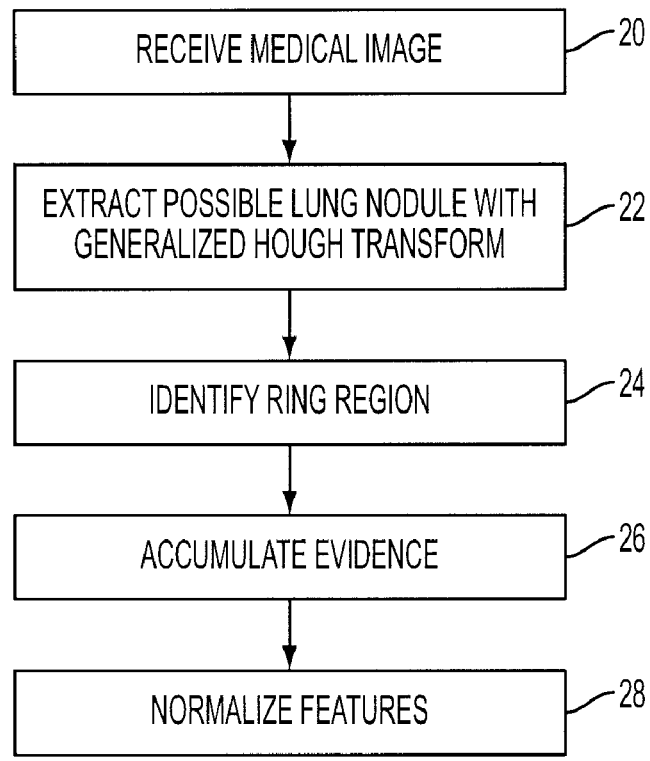
FIG. 1 is a flow chart diagram of one embodiment of a method for feature processing of lung nodule features in computer-assisted diagnosis.

FIG. 1 shows a method for feature processing of lung nodule features in computer-assisted diagnosis. The method is implemented by the system of FIG. 5 or a different system, such as a personal computer, a network server, an imaging workstation, or a computer-assisted diagnosis system. The method implements the acts in the order shown or a different order. Additional, different or fewer acts may be provided. For example, act 28 is not performed. As another example, acts 22 and 24 are performed without others of the acts 20, 26, and/or 28.

In act 20, a medical image is received. The medical image is from scans by any modality, such as computed tomography, magnetic resonance, positron emission, ultrasound, or x-ray. For example, the image is an x-ray image for feature extraction and/or any modality for normalization. The medical image represents at least a portion of a patient's lungs. For example, the medical image is a chest x-ray image. Any settings or imaging may be used. The image may represent a two- or three-dimensional region. In the chest x-ray example, the image is a projection through a volume onto a two-dimensional detector. Any resolution may be provided, such as 0.175 mm images with x- and y-dimensions being 2048×2048. The image may be raw detected data or may have been subjected to filtering or other image processes. For example, the medical image is processed to provide image gradient information. The gradient of the intensity at each location of the medical image is calculated.

The medical image of the lungs includes possible lung nodules. There may be none, one, a few (e.g., 1-4), or many actual lung nodules. There may be a same, fewer, or more locations of possible nodules. For example, 50-200 possible nodules exist in the medical image. The actual lung nodules may or may not be included in any identified possible nodules. The number of possible nodules may depend on the process used to identify possible nodules.

In act 22, at least one of the possible lung nodules is extracted from the medical image. Different types of extraction may identify different sets of the possible lung nodules. The location of the possible lung nodules may depend on the extraction or identification technique.

A genuine nodule in a chest x-ray image can be modeled as an overlay of two separate intensity formations. The two formations are a round shaped blob of a genuine nodule and the normal lung region, which may contain different background structures. Except for a few very huge and/or dense nodules, round shaped genuine nodules typically are exhibited as weaker additions to underlying background structures.

The possible nodules may be identified by any feature extraction technique. For example, matching filtering based techniques, adaptive ring filtering based techniques, or other techniques may be used. Combinations of techniques to identify the possible nodules may be used. Providing a fewer number of possible nodules by ruling out false positives while keeping possible nodules more likely associated with an actual or genuine nodule is desired to more efficiently assist a radiologist in review of the medical images.

The blob feature technique may be used to initially identify the possible nodules and/or reduce the number of false positives in previously identified possible nodules. The blob feature technique uses a flexible approach to estimate the support ring region, and/or adds additional validation criteria to improve the discriminating capability. The algorithm may be used to identify features of subtle nodules while still keeping a good discriminating capability on obvious nodules and/or nodules with significant background structures.

The blob feature technique may be used alone, such as being the only feature extracted from the medical image for classification. Alternatively, the blob feature technique is used with other techniques. The blob feature technique contributes a component to feature vectors used to classify the possible nodules. The blob feature may be weighted to contribute more or less than other features. The features may be applied hierarchically, such as using one or more features to identify an initial set of possible nodules in the medical image, and then using the blob feature alone or with other features to reduce the set of possible nodules (e.g., rule out some of the possible nodules as false positives). For example, a candidate position (x, y) is provided for each possible nodule, and the blob feature associated with each candidate position is extracted from the medical image.

Figure 2:
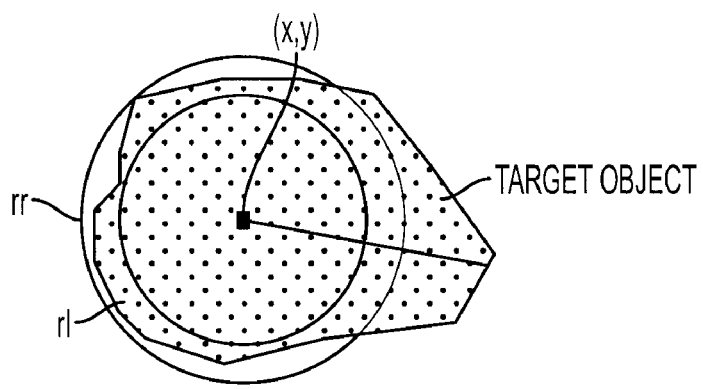
FIG. 2 is a graphical example a possible nodule and ring region of a Hough transform.

FIG. 2 shows one target object with a candidate position (x, y). The position (x, y) is used as an input to the blob feature extraction. In one embodiment, an image representing the gradient of intensities of the x-ray is used. The target object of FIG. 2 shows a region with higher gradient values at the boundary indicated by the dot pattern. The target object has an irregular, but generally circular or elliptical border (e.g., a blob border). Other size and/or shaped target objects may be provided. The target object is not input, but is, at least in part, quantified by the blob feature extraction.

For the blob feature technique, a value is extracted for at least one of the possible lung nodules from the medical image. The value is binary (e.g., should be a possible nodule or is a false positive) or non-binary (e.g., any range of values).

The value is extracted as a function of a generalized Hough transform. The generalized Hough transform identifies an imperfect instance of a shape. Any shape maybe used, such as a circle or ellipse. In one embodiment, the shape is a ring shape. The ring shape feature is identified by a voting procedure in a parameter space. The algorithm is a generalized Hough transform algorithm to derive an estimate of a support ring region that approximately covers the boundary region of a nodule. Rather than identifying the actual boundary, the generalized Hough transform identifies a border region.

In act 24, the ring region covering the possible lung nodule is identified. The ring region is a donut type shape. The ring region covers the possible lung nodule without identifying a boundary of the possible lung nodule. FIG. 2 shows the ring around a majority of the boundary of the target object. The ring may be shifted relative to the target object. For each possible lung nodule, a plurality of different candidate positions of the center of the ring (x, y) is investigated. The highest scoring or best match is selected. For each candidate position of the possible lung nodule, the ring region is identified with the generalized Hough transform.

The support ring region, Rg, is a circular or other shaped ring. A circular ring may be defined as:

$$Rg(x, y) = \begin{cases} 1, & \text{if } rl^2 \leq x^2 + y^2 \leq rr^2 \\ 0, & \text{otherwise} \end{cases},$$

where rl and rr are the inner and outer radius of Rg. rl and rr are determined by the generalized Hough transform algorithm based on a number of criteria. Generally, the difference between rl and rr is as small as possible. The support ring region is as thin as possible to ensure reliable evidence accumulation. If a possible nodule is a perfect circle, then the support ring region should be a thin circular ring with rl and rr being approximately the radius of the circle. However, in practice, nodules are not perfectly circular. The support ring region has a certain width to cover a sufficient amount of nodule boundary. Any determination of sufficient may be used, such as sufficient being based on the criteria in the parameter space of the Hough transform. If the width of the support ring region is too wide, then the technique degrades to an iris filtering-like technique. Large width may be avoided to concentrate on analysis of evidence around the target boundary. The width may be limited, such as by a predetermined percentage of radius or actual distance limit. If the width of the support region is too narrow, then the ring region may not be able to cover a sufficient portion of the boundary for irregular nodules. In one embodiment, the width of the support ring region is restricted to a fixed pre-determined range. For example, the width is between the distances represented by 3-5 pixels of the medical image. The radius may be limited, such as being between the distances represented by 5-15 pixels.

In one embodiment, the pre-determined width and/or radius depends on a scale level. For example, a matching filter based peak analysis technique and an adaptive ring/iris filter based localized gradient vector analysis technique are combined. A set of Laplacian of Gaussian (LoG) filters is applied to an input image to obtain a pyramid of enhanced images tuned to nodule sizes of different ranges. The peak like intensity formation is accessed in a piecewise way to tolerate unavoidable background anatomical structures. A multi-level local curve analysis algorithm tracks curve segments of a boundary of a binary shape formed by applying a threshold. If a local boundary segment is a locally convex boundary segment, is sufficiently curved, and its normal points to the center candidate position, then the curve corresponds to a radius of a target object. The width is limited based on the radius. One possible algorithm for determining the radius is given by:

Input:
　The filtered image F(x,y) and a candidate position (x,y)
Output:
　Radius, r, of the peak at (x,y).
Algorithm:
　1. Initialize r, Lt, and a 2D images, A1 to zeros.
　2. For each threshold, t, from the peak value at F(x,y) to 0 a. Segment F(x,y) using t in the neighborhood of (x,y) to produce a binary shape, B and trace the boundary, C, of B.
b. Initialize e, an array, Aw, of size C and an array, Aa of size 360 to zeros.
c. For each pixel, (u,v), in C
   If the normal, n, of C at (u,v) is pointed to (x,y) and all the pixels on the straight line between (u,v) and (x,y) are inside B, then label Aw(i), where i is the index of pixel (u,v).
d. If more than 50% of the pixels in C with their Aw( ) labeled, then 1. increase e by one and 2. label A1(u,v).
3. If e is less than 20, set r to 8 and go to 4.
   a. Estimate the radius, r, of the connected component formed in A1.
4. Return r Other algorithms may be used to limit the width and/or radius.

The generalized Hough transform operates in a parameter space. One or more criteria are applied to determine the size and location of the ring region. Any criteria may be used, such as gradient-based criteria. In one embodiment, connected components, gradient direction, and radial gradient value criteria are used. The connected components criterion applies a threshold to the information to identify a continuous region above the threshold and connected to the currently tested position of the possible nodule. Any threshold may be used, such as determining an average in the image and using the average as the threshold. A lung mask may be used to determine the lung region from which to determine the average. The gradient direction criterion determines whether the gradients in the ring region point to the center of the currently tested ring region. The radial gradient value criterion determines whether the outward facing gradient along the radial line at a give pixel location within the ring region is larger than a threshold, such as zero. A negative gradient indicates the pixel is part of the background. Using the generalized Hough transform, a support ring region which is defined by the rr and rl values and corresponding to the best criteria is determined.

In act 26, evidence is accumulated. After the support ring region is obtained, gradient analysis is used to accumulate evidence inside the support ring region and beyond to evaluate the possibility of presence of a circular blob.

A score of possible lung nodule features corresponding to the feature ring shape is calculated. For a ring region, the score is calculated as a function of gradient information associated with the feature ring shape.

At each pixel inside the support ring region and beyond, a number of criteria are evaluated to assess whether the pixel should contribute a positive weight to the blob feature score. Any criteria may be used as evidence. In one embodiment, the evidence is accumulated as a function of gradient information. Non-gradient criteria may be used.

The score is assigned as a function of parameters representing different gradient attributes of the gradient information. If each parameter or criterion is satisfied, then a weight is increased or added to a current value. For example, a weight is added to for each pixel of a region with continuous radially connected gradient amplitude, a distance to a gradient normal line being less than a first threshold, a gradient direction along a radius, and a radial outward gradient amplitude being larger than a second threshold. The first criterion (continuous radially connected gradient amplitude) accommodates imperfect round shaped nodules, such as the target region illustrated in FIG. 2. The criteria accounts for pixels outside the ring region as well as within the ring region. The second criterion (the distance to a gradient normal line) is a general circular shaped restriction. Any threshold may be used, such as 0.5 rl. The last two criteria (gradient direction along a radius and radial outward gradient amplitude) are the same or similar criteria as the ones used in the generalized Hough transform to identify rr and rl. Additional, different, or fewer criteria may be used. In other embodiments, the weight is added to for each of the criteria met or using other valuation approaches.

In summary, in one embodiment, the procedure is represented as:
a. Using a generalized Hough transform to find a support ring region centered at (u,v) which is defined by rl and rr. The criteria used in the Hough transform include:
   i. A pixel, (xi,yi), is inside a connected component with gradient amplitude being larger than a threshold (The 50 percentile of the gradient amplitude in the lung region).
   ii. The gradient direction at (xi,yi) points to (u,v)
   iii. The radial outward gradient at (xi, yi) is larger than a threshold (0).
b. Accumulate evidence, ft, a positive weight, if all of the following criteria are satisfied:
   i. A pixel, (xi, yi), is within the support ring region,(rl, rr) or is outside rr but connected to (rl,rr) along the radial direction with all the previous pixels satisfied the criteria.
   ii. The distance from (u,v) to the normal line passing through (xi,yi) is less than a threshold (0.5 rl).
   iii. The gradient direction at (xi,yi) points to (u,v).
   iv. The radial outward gradient at (xi,yi) is larger than a threshold (0).

After completing the accumulation of evidence, a blob feature score F is output. The blob feature score represents evidence of the existence of an actual nodule at the initial location (x, y) of the feature. In other embodiments, the blob feature score may be processed and/or be binary. For example, a threshold is applied to the score. If above the threshold, the blob feature is indicated or confirmed as a possible nodule. If below the threshold, then the score indicates a failure to satisfy the parameter space criteria.

The above procedure is applied to a small neighborhood of a nodule position. For each possible position around a nodule candidate, a score is determined. The best score is selected as the final output.

The generalized Hough transform and scoring are repeated for each possible nodule. A blob feature score is provided for each possible nodule. A higher score may indicate an increased or higher relative likelihood of a possible nodule being an actual nodule.

The blob feature score may be used for classifying, such as being one of multiple features extracted for each possible nodule. The scores may be used by a programmed or trained classifier to determine whether to indicate the location to a radiologist for confirmation or further study.

In act 28, the blob feature values or scores for the possible nodules are normalized. The feature values for a plurality of possible lung nodules are normalized as a function of the spatial distribution of the feature values in the medical image.

Figure 3:
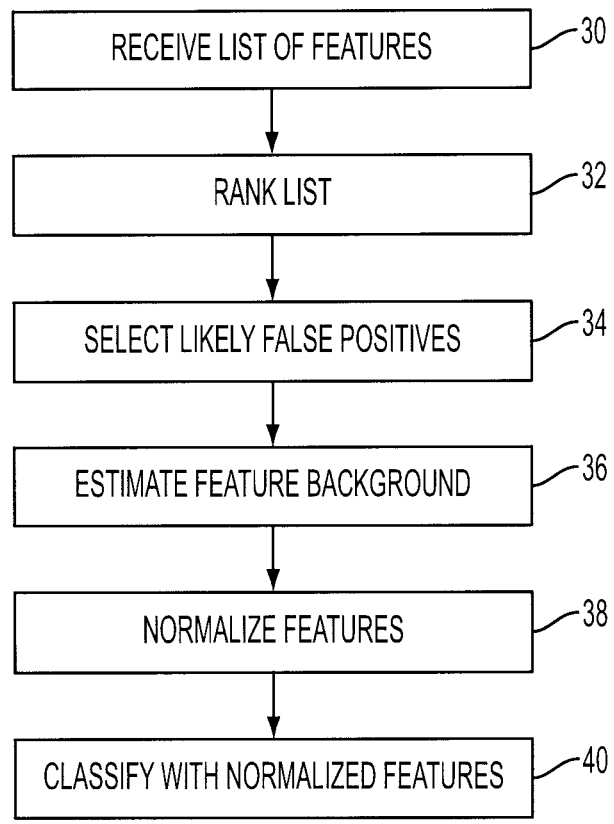
FIG. 3 is a flow chart diagram of another embodiment of a method for feature processing of lung nodule features in computer-assisted diagnosis.

FIG. 3 shows a method for feature processing by normalization in computer-assisted diagnosis. The method is implemented by the system of FIG. 5 or a different system, such as a personal computer, a network server, or an imaging workstation. The method implements the acts in the order shown or a different order. Additional, different or fewer acts may be provided. For example, act 40 is not performed. The method may be performed without selecting for false positives and/or ranking in acts 32 and 34.

Feature normalization accounts for background variation. The features may be normalized without attempting to normalize the image for specific background structures. Image normalization may also be provided. For example, ribs are suppressed from the chest-x-ray images. Image normalization may only solve a one part of the uneven background issue. The lung region in a chest x-ray image is highly non-uniform. Nodules, which can be viewed as an overlay of relatively high intensity round shaped blobs, exhibit significant formation variations at different locations. A nodule in a vessel tree region and/or a boundary region may need to be more distinguishable to be detectable than a nodule in the middle of lung lobe region. The vessel tree and boundary regions of the lungs have increased background variation, making detection of nodules more difficult. If the lung region is normalized to form a uniform background, then position dependency may be removed or reduced. However, the relationship between a nodule and the surrounding background is complicated. Complex background structures, such as vessel trees, ribs, shadow of heart, and deformations due to different complications, make it difficult to design an image normalization algorithm to smooth out the non-uniformity in a chest x-ray image.

Feature normalization is based on a background correction process operating on the underlying feature rather than image structure. The technique estimates the background of a given feature and normalizes the feature by subtracting the estimated feature background from the feature. Any type of feature may be normalized. Normalization is provided for all, some, or only one of the types of features.

In act 30, a list of features is received. The list of features is for one type of extracted feature, such as a list of scores of the blob feature. Each feature value or feature is associated with a different location within the image. The list is output by a feature extraction technique.

Figure 4:
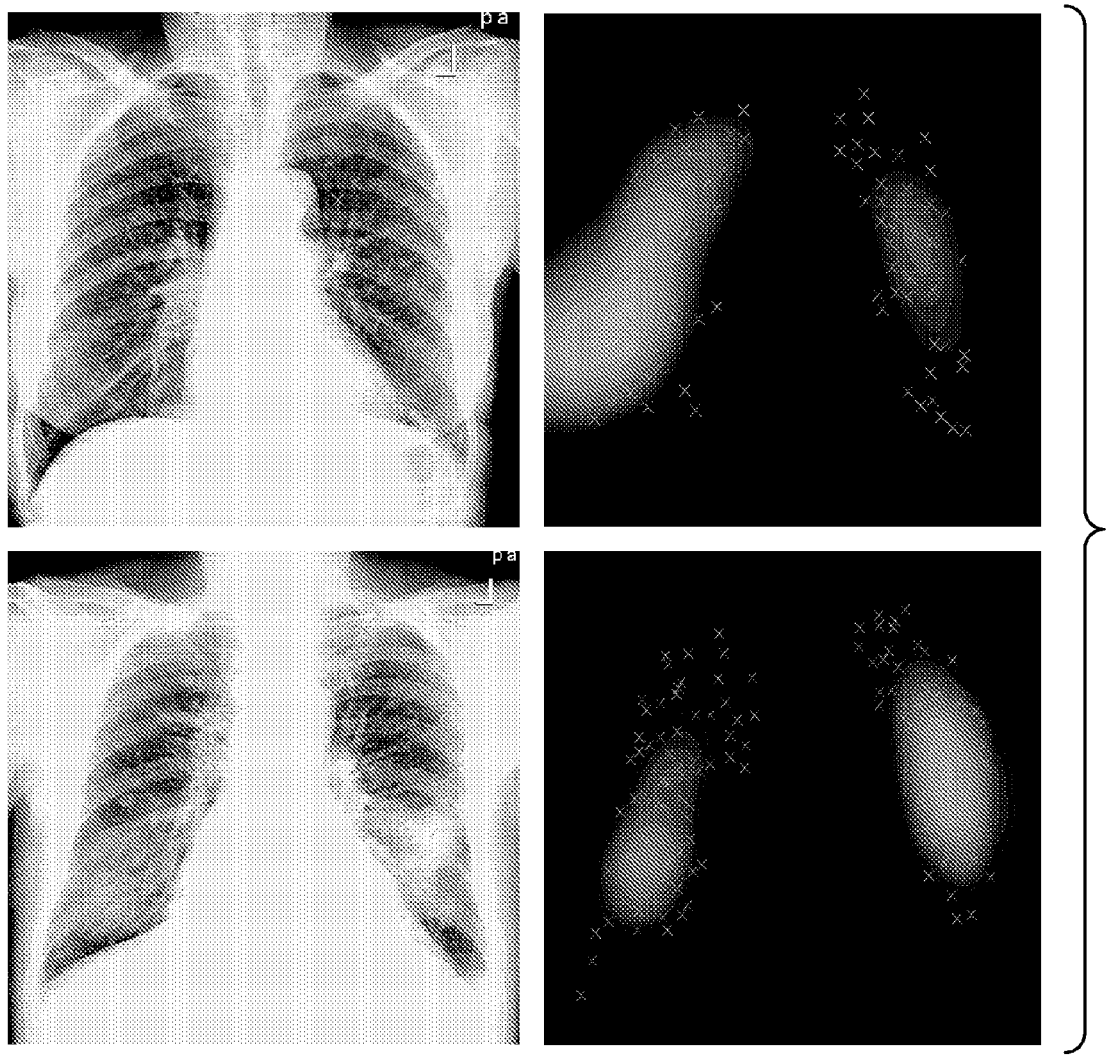
FIG. 4 shows two example x-ray images and corresponding feature backgrounds derived from extracted features of the x-ray images.

The list is received as a candidate list of feature values associated with features extracted from a medical image having possible lung nodules. The features values are scores. The scores generally indicate a strength of the extracted feature at each of different locations within the medical image. For example, FIG. 4 shows x-ray images and feature backgrounds with an "x" at each location for which a possible nodule is located. Any number of possible nodules and corresponding feature values may be used, such as 50-200.

A lung mask may also be received or generated. The lung mask is used to limit the location of features and/or the generation of the feature background.

In act 32, the features are ranked. The ranking is as a function of the feature score. More than one type of feature may be used to rank the features. For example, the blob feature with or without other features is used to identify feature values more likely associated with a false positive. The classifier to which the features are input in act 40 or a different classifier may be used in other embodiments to identify features associated with a false positive.

Alternatively, the score output as part of extraction is used for ranking. The candidate generation algorithm (e.g., blob feature extraction algorithm) produces an assessment for each candidate of how likely a candidate indicates a genuine nodule. By ranking the candidates in a candidate list in a decreasing order of the assessment value, the candidates that indicate genuine nodules tend to be more highly ranked while false positives tend to have a lower ranking. Inaccurate ranking may be provided.

In a typical chest x-ray image, only a limited number (e.g., 0-4) of genuine nodules may be present. Most of the candidates or possible nodules in a chest x-ray image are false positives. In act 34, the feature values more likely associated with a false positive are selected as a function of the ranking. The higher scoring features are removed from the list. Any number of features may be pruned or removed, such as removing the top 1-10 from a list of 100-200 features. Alternatively, a score threshold is applied to divide the list. Since the genuine nodules are mostly at the top of the ranking, the candidate list is cut at a certain rank in another embodiment. The result is a pruned candidate list that more likely consists of mostly false positives. These false positives are spread around the image from which the candidates are extracted.

In act 36, a feature background is estimated. The feature background is estimated from the features or feature values selected in act 34. The selected sub-set of the feature values of the candidate list are used in one embodiment, but other sub-sets or the full set of feature values may be used. If a candidate in the pruned candidate list has a feature value that is high, then the feature value indicates that a nodule around the neighborhood of the candidate needs to have a higher feature value to be differentiable from the background. A feature background inside the lung region is derived from the candidates in the pruned candidate list to account for background variation included within the feature value calculations.

Any estimation function may be used. In one embodiment, a Gaussian kernel is applied for each of the locations for which a feature value is provided. The background may be created for the entire lung region, a portion of the lung region, or for locations for which the original candidate list indicates a possible nodule. Let $F_i$ be the feature value of the ith candidate in the pruned or selected candidate list. $R_i$ is the estimated size of the ith candidate. The size may be determined by thresholding or other approaches. For example, the size is determined as discussed above to determine the radius. The size may be an area, radius, diameter, volume, or other value. The feature background, B(x,y), inside the lung region is estimated as:

$$B(x, y) = \frac{1}{N}\sum_{i=1}^{N} \sum_{(u,v)\in S} F_i k_{R_i}(u - x, v - y),$$

where $k_{R_i}(u-x,v-y)$ is a kernel function. Any smoothing kernel function may be used, such as a Gaussian function centered at the candidate position and with standard deviation of two times the size of the candidate, $2R_i$. Other deviations may be used, such as based on an average radius or a predetermined value. S represents a support region. Any size support region may be used, such as a $10R_i \times 10R_i$ region. Other estimation functions may be provided, such as a low pass filtering function.

The function estimates spatial variation of the feature values likely to be false positives. A field of background feature values is interpolated, extrapolated, or otherwise formed using the Gaussian or other function. Values for locations in between locations associated with feature values are interpolated or otherwise determined to create a smoothly varying background field. For a given location, the feature value is estimated from surrounding feature values, whether actually derived or interpolated. In an alternative embodiment, only actually derived features values are used to determine the value in a given location. For example, the Gaussian function or an average is applied to determine the background feature value or score for a given location. The background score is the average or other value of actually derived feature values within the support region.

FIG. 4 shows two examples. A plurality of possible nodules likely to be false positives are identified and designated with an "x" in the x-ray images. After masking out non-lung regions, the feature background is estimated. The figures on the left show the feature background estimated from the possible nodules likely to be false positives. The feature background represents an approximation of what a minimum feature value at a position, (x,y), should be to more likely be a genuine nodule. In FIG. 4, the mapping is reversed to better show the effect. The feature background may be filtered or processed, such as further smoothing by low pass filtering.

In act 38, the feature values are normalized. The feature values of the candidate list are normalized as a function of the feature background. The spatial variation of the feature values, due at least in part to the background, is removed or reduced. The feature values are corrected by subtracting the feature background values at the respective location. Division or other normalization functions, such as for correcting log scale values, may be used. The feature scores of all of the features in the list are corrected as a function of the spatially corresponding background score. The normalization of the feature values may result in different possible nodules being more likely or less likely to be actual nodules. For example, a previously highly ranked feature value may have had a high value due to strong background information. After correction, the possible nodule may be associated with a weak feature value.

One type or multiple types of feature values may be normalized. For example, the blob feature derived as a function of a Hough transform is normalized, but other features are not normalized.

In act 40, the possible nodules are classified as a function of the normalized feature values. Any classification may be used. For example, a learned or trained classifier is provided, such as a Weka's Naive Bayes classifier. The normalized feature values may be used for a final outcome or classification. Alternatively, the normalized feature values are used to classify a sub-set of the possible nodules as false positives. Further classification may be provided where the further classification uses or does not use normalized feature values.

Figure 5:
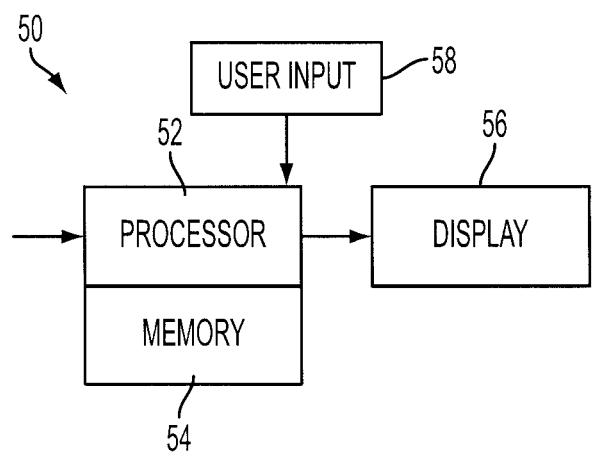
FIG. 5 is a block diagram of one embodiment of a system for feature processing of lung nodule features in computer-assisted diagnosis.

FIG. 5 shows one embodiment of a system 50 for feature processing of lung nodule features in computer-assisted diagnosis. The system 50 is a workstation, personal computer, network, server, computer-aided diagnosis system, imaging system, computed tomography system, medical diagnostic imaging system, or other now known or later developed processing system. For example, a local or remote workstation receives images for computer-assisted diagnosis. The system 50 implements the methods of FIGS. 1 and/or 3 or different methods.

The system 50 includes a processor 52, a memory 54, a display 56, and a user input 58. Additional, different or fewer components may be provided. For example, the system 50 does not include the user input 58 and/or display 56. As another example, the system 50 includes a sensor, such as an x-ray imaging system with digital detection. In other embodiments, a scanner is provided for scanning x-ray films. The components are shown adjacent one another, such as in a same room, on a same cart, or in a same housing. In other embodiments, one or more components are remote, such as the memory 54 being a remote database or the display 56 being on a networked or wireless device.

The user input 58 is a keyboard, button, slider, mouse, touch pad, touch screen, trackball, dial or other now known or later developed input device. The user input 58 is part of a user interface generated or controlled by the processor 52. The user interacts with the computer-aided diagnosis system 50 to identify nodules or review possible nodules.

The processor 52 is one or more general processors, digital signal processors, application specific integrated circuits, field programmable gate arrays, servers, networks, digital circuits, analog circuits, combinations thereof, or other now known or later developed device for processing medical image data. The processor 52 implements a software program, such as manually generated or programmed code or such as a trained classification or model system. The software identifies possible nodules, extracts features associated with possible nodules, corrects feature values, and/or classifies the possible nodules. Alternatively, hardware or firmware implements the feature processing. The processor 52 obtains the image data, operation instructions and/or other information from the memory 54.

The processor 52 is operable to extract feature values. For example, the processor 52 applies a Hough transform to extract feature values based on parameter space calculations without specifically identifying a border. These blob features are calculated based on a generalized or approximate border region to indicate how likely a possible nodule is to be an actual nodule and/or to identify a possible nodule.

The processor 52 alternatively or additionally normalizes feature values. Any one or more types of features of a medical image are normalized. The features are normalized based on the feature value distribution in the medical image and value. A list of the features is received, such as by transfer or processing to identify the features. The list includes a feature value for each feature. A sub-set of the list is selected. The features more likely to be a false positive are selected. The feature value distribution is determined from the feature values of the sub-set. A background field of values or scores is determined as the distribution of feature values. The feature value distribution is interpolated from the feature values more likely to be false positives using a spatial Gaussian or other kernel. Values of the feature value distribution are subtracted from the feature values of the list. Other normalization functions may be used, such as division.

The processor 52 may classify the possible nodules. Each possible nodule is classified as a false positive or not. The blob feature values and/or normalized feature values are used to classify whether the features are possible lung nodules.

The memory 54 is a computer readable storage media. Computer readable storage media include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 54 stores the image data (e.g., x-ray intensity image or gradient image) for or during processing by the processor 52. The image data is input to the processor 52 or the memory 54. In one embodiment, the image data is display data. In other embodiments, the image data is data before conversion to a display format, such as sensor data or detected data.

In one embodiment, the memory 54 is a computer readable storage media having stored therein instructions executable by the programmed processor 52. The processor 52 implements automatic or semiautomatic operations discussed herein, at least in part, with the instructions. The instructions cause the processor 52 to implement any, all or some of the functions or acts described herein. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

In one embodiment, the instructions are stored on a removable media drive for reading by a medical diagnostic imaging system, a computer-aided diagnosis system, or a workstation networked with imaging systems. An imaging system or workstation uploads the instructions. In another embodiment, the instructions are stored in a remote location for transfer through a computer network or over telephone communications to the imaging system or workstation. In yet other embodiments, the instructions are stored within the system on a hard drive, random access memory, cache memory, buffer, removable media or other device.

The display 56 is a monitor, CRT, LCD, plasma, flat screen, touch screen, projector, printer, or other now know or later developed display device. The display 56 outputs an indication of the segmentation. For example, the display 56 outputs an image generated from the x-ray with overlaid indications of possible nodules. The indications of possible nodules, such as a marker, coordinates, or symbol show a location of a feature classified as being a possible lung nodule. Other outputs may be provided.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for feature processing of lung nodules in computer-assisted diagnosis, the method comprising:
   receiving a candidate list of feature values associated with features extracted from a medical image having possible lung nodules;
   estimating, with a processor, a feature background from at least a sub-set of the feature values of the candidate list; and
   normalizing the feature values of the candidate list as a function of the feature background.

2. The method of claim 1 further comprising:
   ranking the features of the candidate list as a function of the feature values; and
   selecting the feature values more likely associated with a false positive as a function of the ranking;
   wherein estimating comprises estimating from the selected features values.

3. The method of claim 1 wherein receiving the candidate list comprises receiving features values for features extracted from the medical image as a function of a Hough transform.

4. The method of claim 1 wherein estimating the feature background comprises interpolating from the feature values as a function of a Gaussian function.

5. The method of claim 1 wherein normalizing comprises subtracting a background value of the feature background from the feature value representing a same spatial location for each of the feature values of the candidate list.

6. The method of claim 1 wherein estimating comprises estimating spatial variation of the feature values and wherein normalizing comprises removing the spatial variation from the feature values.

7. The method of claim 1 wherein receiving comprises receiving the feature values as scores indicating a strength of the extracted feature at different locations within the medical image.

8. The method of claim 1 further comprising classifying whether each feature is a lung nodule as a function of the normalized feature values.

9. A system for feature processing of lung nodule features in computer-assisted diagnosis, the system comprising:
   a processor operable to normalize feature values for features of a medical image as a function of the feature values distribution in the medical image and operable to classify whether the features are possible lung nodules as a function of the normalized feature values; and
   a display operable to display a location on the medical image of the features classified as possible lung nodules.

10. The system of claim 9 wherein the processor is operable to normalize by receiving a list of the features, selecting a sub-set of the list more likely a false positive, determining the feature value distribution from the feature values of the sub-set, and subtracting values of the feature value distribution from the feature values of the list.

11. The system of claim 9 wherein the processor is operable to normalize by interpolating the feature value distribution as a function of the feature values and a spatial Gaussian kernel.

12. In a non-transitory computer readable storage media having stored therein data representing instructions executable by a programmed processor for feature processing of lung nodule features in computer-assisted diagnosis, the storage media comprising instructions for:
   receiving a list of features;
   ranking the features in the list as a function of feature score;
   removing higher scoring features from the list;
   estimating a background score as a function of location from the feature scores of the list after removing; and
   correcting the feature scores of the features in the list as a function of the background score.

13. The non-transitory computer readable storage media of claim 12 wherein estimating comprises applying a Gaussian kernel for each of the locations.

14. A method for feature processing of lung nodule features in computer assisted diagnosis, the method comprising:
   receiving a medical image having possible lung nodules; and
   extracting, with a processor, at least one of the possible lung nodules from the medical image as a function of a Hough transform;
   wherein extracting comprises identifying a ring region covering the at least one possible lung nodule without identifying a boundary of the at least one possible lung nodule.

15. The method of claim 14 wherein identifying the ring region comprises, for each candidate position of the at least one possible lung nodule, identifying the ring region with the Hough transform criteria of connected components of gradient amplitude, gradient direction, and radial gradient value.

16. The method of claim 14 wherein extracting comprises accumulating evidence as a function of gradient information.

17. The method of claim 16 wherein accumulating evidence comprises adding a weight for each pixel of the rinq region with continuous radially connected gradient amplitude, a distance to a gradient normal line being less than a first threshold, a gradient direction along a radius, and a radial outward gradient amplitude being larger than a second threshold.

18. The method of claim 14 further comprising normalizing feature values for a plurality of possible lung nodules as a function of a distribution of feature values in the medical image.

19. In a non-transitory computer readable storage media having stored therein data representing instructions executable by a programmed processor for feature processing of lung nodule features in computer-assisted diagnosis, the storage media comprising instructions for:
- identifying an imperfect instance of a feature ring shape by a voting procedure in a parameter space; and
- calculating a score of a possible lung nodule feature corresponding to the feature ring shape, the score calculated as a function of gradient information associated with the feature ring shape.

20. The non-transitory computer readable storage media of claim 19 wherein the instructions for identifying comprise identifying a ring region covering the at least one possible lung nodule without identifying a boundary of the at least one possible lung nodule.

21. The non-transitory computer readable storage media of claim 19 wherein the instructions for calculating the score comprise assigning the score as a function of parameters representing different gradient attributes of the gradient information.

* * * * *